(12) United States Patent
Asp et al.

(10) Patent No.: US 7,760,104 B2
(45) Date of Patent: Jul. 20, 2010

(54) IDENTIFICATION TAG FOR FLUID CONTAINMENT DRUM

(75) Inventors: Wayne Asp, Shakopee, MN (US); Jeffrey J. McKenzie, Watertown, MN (US); John M. Hennen, Carver, MN (US)

(73) Assignee: Entegris, Inc., Billerica, MA (US)

( * ) Notice: Subject to any disclaimer, the term of this patent is extended or adjusted under 35 U.S.C. 154(b) by 1137 days.

(21) Appl. No.: 11/400,053

(22) Filed: Apr. 7, 2006

(65) Prior Publication Data

US 2006/0283932 A1    Dec. 21, 2006

Related U.S. Application Data

(60) Provisional application No. 60/669,847, filed on Apr. 8, 2005.

(51) Int. Cl.
*G08B 21/18* (2006.01)
*G06Q 10/00* (2006.01)
*B65B 3/04* (2006.01)

(52) U.S. Cl. .................. 340/603; 220/200; 705/28; 141/2

(58) Field of Classification Search .......... 220/200; 141/2; 340/603; 705/28
See application file for complete search history.

(56) References Cited

U.S. PATENT DOCUMENTS

| | | | |
|---|---|---|---|
| 3,660,200 A | 5/1972 | Anderson et al. |
| 4,605,591 A | 8/1986 | Nose et al. |
| 4,699,298 A | 10/1987 | Grant et al. |
| 4,827,110 A | 5/1989 | Rossi et al. |
| 4,891,254 A | 1/1990 | Bianco |
| 4,965,933 A | 10/1990 | Mraz et al. |
| 5,108,015 A | 4/1992 | Rauworth et al. |
| 5,152,057 A | 10/1992 | Murphy |
| 5,194,327 A | 3/1993 | Takahashi et al. |
| 5,203,060 A | 4/1993 | Mraz et al. |
| 5,344,703 A | 9/1994 | Kovar et al. |

(Continued)

FOREIGN PATENT DOCUMENTS

EP    0 855 675 A2    7/1998

(Continued)

OTHER PUBLICATIONS

LGInternational Identification Technologies, "The FIM Process Illustrated" two-page printout from website, Copyright 2001.

(Continued)

*Primary Examiner*—Gregory L Huson
*Assistant Examiner*—Nicolas A Arnett
(74) *Attorney, Agent, or Firm*—Patterson Thuente Christensen Pedersen, P.A.

(57) ABSTRACT

A fluid containment and dispensing system having a RFID tag associated therewith. The fluid containment and dispensing system includes a fluid containment drum having an opening defined thereon. The fluid containment and dispensing system further includes a dispensing mechanism operably coupleable with the opening, the dispensing mechanism configured to dispense the contents of the fluid containment drum. An identification tag is coupleable with the dispensing mechanism and includes a first laminate, a second laminate laminated to the first laminate, and a RFID member disposed between the first and second laminates, wherein the RFID member includes information associated with a fluid containment and dispensing system.

15 Claims, 10 Drawing Sheets

U.S. PATENT DOCUMENTS

| | | |
|---|---|---|
| 5,389,769 A | 2/1995 | Yamashita et al. |
| 5,420,757 A | 5/1995 | Eberhardt et al. |
| 5,448,110 A | 9/1995 | Tuttle et al. |
| 5,526,956 A | 6/1996 | Osgar |
| 5,528,222 A | 6/1996 | Moskowitz et al. |
| 5,779,839 A | 7/1998 | Tuttle et al. |
| 5,811,197 A | 9/1998 | Nishiyama et al. |
| 5,953,682 A * | 9/1999 | McCarrick et al. ............ 702/45 |
| 5,957,328 A | 9/1999 | Osgar |
| 5,973,600 A | 10/1999 | Mosher, Jr. |
| 5,986,569 A | 11/1999 | Mish et al. |
| 6,013,949 A | 1/2000 | Tuttle |
| 6,025,054 A | 2/2000 | Tiffany, III |
| 6,027,027 A | 2/2000 | Smithgall |
| 6,045,000 A | 4/2000 | Rauworth et al. |
| 6,100,804 A | 8/2000 | Brady et al. |
| 6,147,662 A | 11/2000 | Grabau et al. |
| 6,164,530 A | 12/2000 | Cheesebrow et al. |
| 6,177,859 B1 | 1/2001 | Tuttle et al. |
| 6,195,007 B1 | 2/2001 | Takayama et al. |
| 6,206,282 B1 | 3/2001 | Hayes, Sr. et al. |
| 6,209,592 B1 * | 4/2001 | Gilboa et al. ................ 141/94 |
| 6,248,199 B1 | 6/2001 | Smulson |
| 6,255,949 B1 | 7/2001 | Nicholson et al. |
| 6,259,367 B1 | 7/2001 | Klein |
| 6,302,461 B1 | 10/2001 | Debras et al. |
| 6,325,294 B2 | 12/2001 | Tuttle et al. |
| 6,330,971 B1 | 12/2001 | Mabry et al. |
| 6,340,932 B1 | 1/2002 | Rodgers et al. |
| 6,451,154 B1 | 9/2002 | Grabau et al. |
| 6,483,434 B1 | 11/2002 | UmiKer |
| 6,522,549 B2 | 2/2003 | Kano et al. |
| 6,609,041 B1 | 8/2003 | Sanka et al. |
| 6,661,339 B2 | 12/2003 | Muirhead |
| 6,718,888 B2 | 4/2004 | Muirhead |
| 6,720,865 B1 * | 4/2004 | Forster et al. .............. 340/10.1 |
| 6,720,877 B2 | 4/2004 | Lian et al. |
| 6,758,000 B2 | 7/2004 | Sandt et al. |
| 6,771,981 B1 | 8/2004 | Zalewski et al. |
| 6,778,089 B2 | 8/2004 | Yoakum |
| 6,816,076 B2 | 11/2004 | Pomes |
| 6,879,876 B2 | 4/2005 | O'Dougherty et al. |
| 6,886,246 B2 | 5/2005 | Chung |
| 6,900,536 B1 | 5/2005 | Derbenwick et al. |
| 6,943,678 B2 | 9/2005 | Muirhead |
| 7,152,781 B2 * | 12/2006 | O'Dougherty et al. ...... 235/376 |
| 7,273,172 B2 * | 9/2007 | Olsen et al. .................. 235/385 |
| 7,370,791 B2 * | 5/2008 | O'Dougherty et al. ...... 235/376 |
| 7,456,418 B1 * | 11/2008 | Stevens et al. ........... 250/506.1 |
| 2002/0124945 A1 | 9/2002 | Muir et al. |
| 2002/0187025 A1 | 12/2002 | Speasl et al. |
| 2003/0010387 A1 | 1/2003 | Rauworth et al. |
| 2003/0135388 A1 | 7/2003 | Martucci et al. |
| 2003/0235027 A1 | 12/2003 | Smeyak et al. |
| 2004/0041709 A1 | 3/2004 | Forster |
| 2004/0094949 A1 | 5/2004 | Savagian et al. |
| 2004/0168618 A1 | 9/2004 | Muirhead |
| 2004/0238623 A1 | 12/2004 | Asp |
| 2004/0262404 A1 | 12/2004 | Fujiki et al. |
| 2005/0012620 A1 | 1/2005 | Yoakum |
| 2005/0066563 A1 | 3/2005 | Junhan et al. |
| 2005/0068182 A1 | 3/2005 | Dunlap et al. |
| 2005/0099303 A1 | 5/2005 | Zuckerman |
| 2005/0128086 A1 | 6/2005 | Brown et al. |
| 2005/0197074 A1 | 9/2005 | Cullen et al. |
| 2005/0199700 A1 | 9/2005 | Baker et al. |
| 2005/0237184 A1 | 10/2005 | Muirhead |
| 2005/0237195 A1 | 10/2005 | Urban |
| 2005/0241548 A1 | 11/2005 | Muirhead |
| 2005/0280542 A1 | 12/2005 | Schieh |
| 2005/0285735 A1 | 12/2005 | Imura et al. |

FOREIGN PATENT DOCUMENTS

| | | |
|---|---|---|
| JP | 2002024783 A | 1/2002 |
| JP | 2002183695 A | 6/2002 |
| JP | 2002298116 A | 10/2002 |
| WO | WO 94/18700 A1 | 8/1994 |
| WO | WO 00/02236 A2 | 1/2000 |
| WO | WO 00/21030 A1 | 4/2000 |
| WO | WO 00/43952 A1 | 7/2000 |
| WO | WO 02/056344 A2 | 7/2002 |
| WO | WO 03/060818 A2 | 7/2003 |
| WO | WO 2005/081182 A2 | 9/2005 |

OTHER PUBLICATIONS

LGInternational Identification Technologies, "Our FIM system is setting the standard for the rest of the industry" two-page printout from website, Copyright 2001.

Modern Plastics, "RFID is here-is it time for you to worry?," Dec. 2004, pp. 66-67.

* cited by examiner

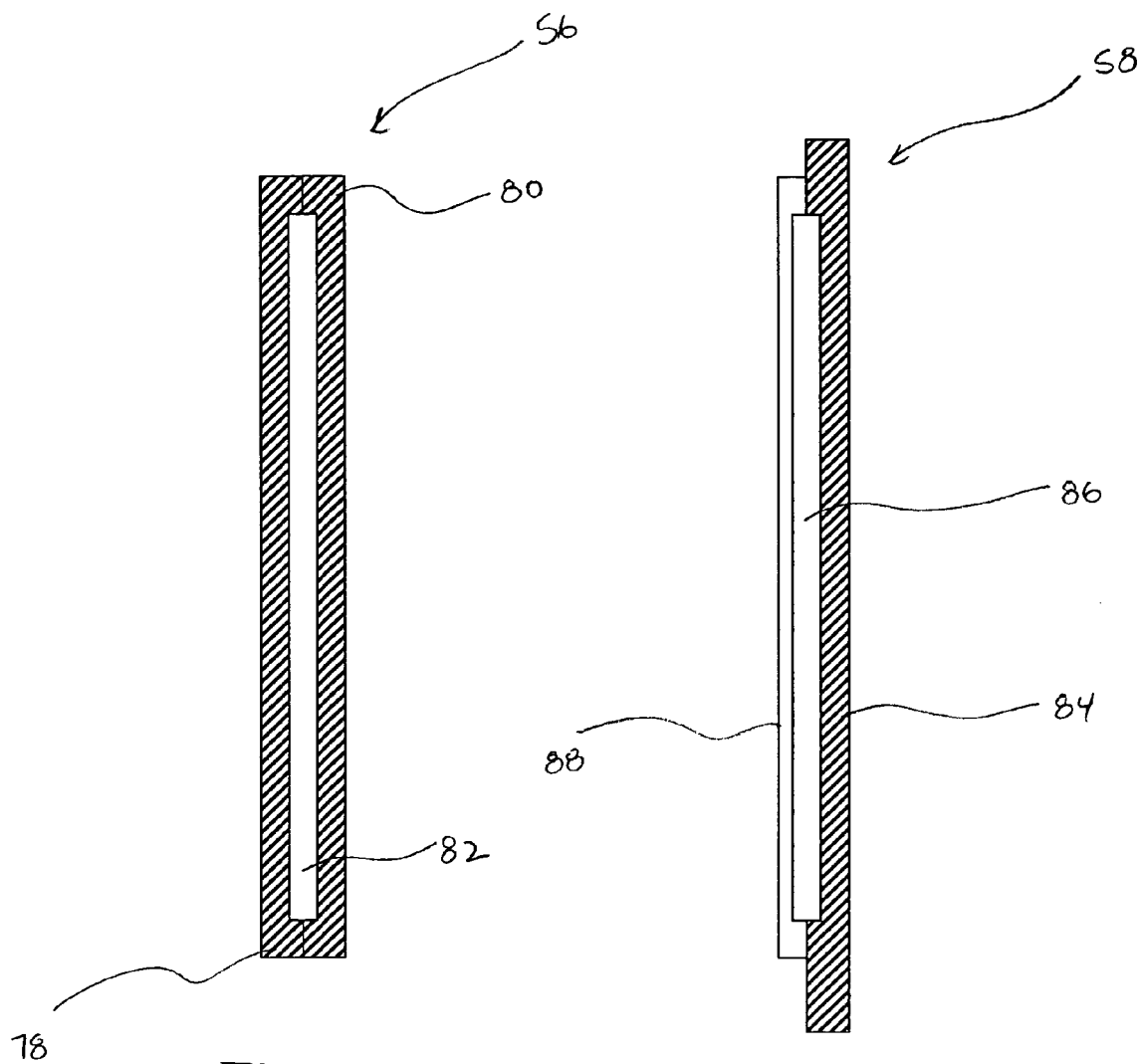

IDENTIFICATION TAG FOR FLUID CONTAINMENT DRUM

RELATED APPLICATION

The present application claims the benefit of U.S. Provisional Application No. 60/669,847, filed Apr. 8, 2005, which is incorporated herein in its entirety by reference.

FIELD OF THE INVENTION

This invention relates generally to fluid dispensing systems. More particularly, the invention relates to a fluid containment and dispensing system having a radio-frequency identification ("RFID") identification tag associated therewith.

BACKGROUND OF THE INVENTION

High purity and highly corrosive liquids are often utilized in industries such as semiconductor processing and chemical manufacturing. Due to quality and safety concerns, these liquids generally must be contained in high integrity fluid containment drums and dispensed using highly reliable dispensing systems. Such dispensing systems can include drum inserts insertable into the fluid containment drums and dispense heads for dispensing the contents thereof.

The containers for handling these liquids are conventionally containment drums formed of high purity polyethylene, such as those described in U.S. Pat. No. 6,045,000. Examples of dispense heads suitable for use with fluid containment drums are described in U.S. Pat. Nos. 4,699,298, 5,108,015, 5,957,328, and 5,526,956. Examples of drum inserts suitable for use with fluid containment drums are described in U.S. Pat. No. 6,045,000 and U.S. Patent Publication No. 2003/0010387.

The connections, tubing, and fittings between the fluid containment drums and equipment are often formed from inert materials, such as various fluoropolymers. For example, the tubing can be formed of perfluoroalkoxy resin (PFA), while the fittings and valve components can be formed of components such as PFA, Poly Tetra Fluoro Ethylene (PTFE), and other various fluoropolymers.

When dealing with the liquids, precaution generally must be taken not to connect equipment requiring a certain type of chemical or fluid to a fluid containment drum containing an incompatible type of chemical or fluid.

One mechanism that has been used to inhibit this are coded rings included on dispense heads and drum inserts, wherein each type of chemical or fluid has a unique code keying. In the event that the codes of the code rings on the drum insert and dispense head do not match, the dispense head will not be connectable to the drum insert, thus inhibiting the mixing or dispensing of improper chemicals or fluids.

However, while the coded rings can represent a first-level of safety for inhibiting the coupling of an incompatible containment drum and equipment, it can be anticipated some users will attempt to bypass this safety feature by using one type of coded ring with multiple chemicals and multiple pieces of equipment, regardless of whether the chemicals and equipment are compatible.

High purity, highly corrosive, and highly caustic liquid handling also can require identification ability with respect to containment drums, drum inserts, dispense heads, and the contents of the containment drums for maintenance and tracking purposes. Presently, bar code labels are adhered to the top or side of the containment drum. However, a scanner must generally be used when using bar codes, which can require a visual line of sight to scan/read the bar code label on the drum and know what material is contained in the drum. This can present a problem in situations where the containment drum is hard to reach or surrounded by other equipment and containment drums. Also, bar coding does not enable the writing of data to the label and thus the ability to change the sequencing and particular of the information contained on the label or to determine statistics and information about containment drums, drum inserts, dispense heads, and the contents of the containment drums from the label itself. Rather, any information must be stored, accessed, and processed elsewhere.

Also, some users simply tether a label or tag having a bar code to a containment drum cap. When using labels tethered to the containment drum cap, the containment drum can lose its identification when the cap is removed to use the containment drum, such as for running the containment drum through a wash station or assembling the containment drums. Once the containment drum and insert lose their identity, a user can lose all history and tracking on the containment drums, drum inserts, dispense heads, components, and drum contents.

Because the general problems discussed above have not been addressed, there is a need for an improved fluid containment and dispensing system addressing the deficiencies inherent with conventional designs.

SUMMARY OF THE INVENTION

The fluid containment and dispensing system having a RFID tag associated therewith of the present invention solves the deficiencies inherent with conventional fluid containment designs by providing a RFID identification tag selectively removably coupleable with at least one of the dispensing mechanism or the fluid containment drum. The identification tag generally includes a RFID member disposed between laminates, such as low-density polyethylene laminates, wherein the RFID member includes information associated with the fluid containment and dispensing system.

In an aspect, the present invention relates to a method of tagging a fluid containment drum, the method comprising providing a fluid containment drum and a drum insert having an upper portion and a tube extending therefrom, operably attaching an identification tag configured as a card to the upper portion of the drum insert, the identification tag comprising at least one laminate and a RFID member presented thereon, the RFID member comprising information associated with at least one of the fluid containment drum and the contents thereof, and operably coupling the upper portion of the drum insert having the identification tag attached thereto with an opening presented on the fluid containment drum, such that the tube extends into an interior of the fluid containment drum for accessing contents thereof, wherein the identification tag is detachable from the drum insert when the drum insert is not coupled with the opening and not detachable from the drum insert without damaging the identification tag when the drum insert is coupled with the opening. The step of operably attaching the identification tag configured as a card to the upper portion of the drum insert can include inserting the tube into the aperture and effecting movement of the identification tag relative to the drum insert until the identification tag is proximate the upper portion and the aperture of the identification tag can be operably attached to the recess.

A recess can be provided proximate a flange included on the upper portion of the drum insert for operably attaching the identification tag thereto, wherein the recess and flange are exterior of the fluid containment drum when the drum insert is operably coupled to the fluid containment drum. In addition, an aperture can be provided on the identification tag, the aperture having a size greater than a size of the recess and less than a size of the flange, such that the aperture can be operably attached to the drum insert at the recess.

In another aspect, the present invention relates to a containment system for highly pure and/or highly caustic fluids, the system comprising a polymer fluid containment drum with a bung and a drum insert having an upper portion and a tube extending therefrom, an identification tag configured as a card operably attached to the upper portion of the drum insert, the identification tag comprising at least one low-density polyethylene laminate and a RFID member presented thereon, the RFID member comprising information associated with at least one of the fluid containment drum and the contents thereof, wherein the upper portion of the drum insert having the identification tag attached thereto is operably coupled with the bung presented on the fluid containment drum, such that the tube extends into an interior of the fluid containment drum for accessing the contents thereof, wherein the identification tag is detachable from the drum insert when the drum insert is not coupled with the opening and not detachable from the drum insert without damaging the identification tag when the drum insert is coupled with the opening. The RFID member can comprise a first film layer, a second film layer, and a RFID tag encapsulated between the first and second film layers.

In a further aspect, the present invention relates to a method of inhibiting dispensing contents contained in a fluid containment drum to a process incompatible with the contents, the system comprising providing a fluid containment drum having a first RFID member associated therewith, the fluid containment drum having an opening defined thereon and a dispensing mechanism operably coupled to the opening and configured to dispense contents of the fluid containment drum, wherein the first RFID member comprises information associated with the contents contained in a fluid containment drum, providing equipment having a second RFID member associated therewith, the equipment configured for operably coupling with the dispensing mechanism, wherein the second RFID member comprises information associated with the equipment, and reading the information from the first and second RFID members to verify that the equipment is compatible with the contents contained in the fluid containment drum before the contents can be dispensed from the fluid containment drum to the equipment. The method can further include the step of reading the RFID tag and automatically enabling dispensing of the fluid only when the RFID tag data matches a selected use at a point of use.

In yet another aspect, the present invention relates to a method of filling and controlling the use of highly pure contents of a polymer fluid containment drum, the method comprising filling a polymer drum having a bung presented thereon with a highly pure processing fluid at a fill location, seating a drum insert comprising a tag having a first RFID member in the bung at the fill location, such that the tag cannot be detached from the drum insert without damaging the tag while the drum insert is seated in the bung, providing the RFID member with data relating to the contents of the drum, operably coupling a closure on the drum insert, and shipping the filled polymer drum with drum insert, tag, and closure to a point of use. The method can further include the step of reading the RFID tag at the point of use and automatically enabling dispensing of the fluid only when the RFID tag data matches a selected use at the point of use. In addition, the method can further include the step of reading the information from the first and second RFID members to verify that the equipment is compatible with the contents contained in the fluid containment drum before the contents can be dispensed from the fluid containment drum to the equipment.

In another aspect, the present invention relates to a fluid containment and dispensing system comprising a fluid containment drum having an opening defined thereon and an interior for containing contents, a drum insert operably coupled to the opening defined on the fluid containment drum, the drum insert having an upper portion and a tube extending therefrom into the interior of the fluid containment drum, an identification tag having an aperture defined thereon operably attached to the drum insert, the identification tag comprising at least one laminate and a RFID member presented thereon, the RFID member comprising first information associated with at least one of the fluid containment drum or the contents thereof, and a second identification member operably attached to at least one of the fluid containment drum or the drum insert, the second identification member comprising second information associated with at least one of the fluid containment drum or the contents thereof.

In another aspect, the present invention relates to a dispensing mechanism that includes a drum insert and a dispense head operably coupleable with the drum insert, the drum insert having an upper portion operably coupleable with the opening and a down tube extending from the upper portion into an interior of the fluid containment drum, wherein the identification tag is selectively removably coupleable to the upper portion of the drum insert. The identification tag can include an aperture extending through the first and second laminates, wherein the aperture is selectively removably coupleable with a recess defined on the upper portion of the drum insert or on the dispense head.

In an aspect, the present invention relates to a RFID member that can selectively store information such as a lot number of the fluid containment drum, a lot number of the drum insert, a lot number of the dispense head, a serial number of the fluid containment drum, a serial number of the drum insert, a serial number of the dispense head, and any combinations thereof. The RFID member can also selectively store information such as an assay of contents contained in the containment drum, an age of contents contained in the containment drum, one or more types of equipment compatible with contents contained in the containment drum, and any combinations thereof. In addition, the RFID member can also selectively store information such as operational cycles of the fluid containment drum, operational cycles of the drum insert, operational cycles of the dispense head, operational cycles of support components associated with one or more of the fluid containment drum, the drum insert, or the dispense head, and any combinations thereof. The RFID member or laminates can include indicia thereon such as a date, a bar code, a serial number, coding information associated with a code ring included with the dispensing mechanism, and any combinations thereof.

In a further aspect, a fluid containment drum includes a first RFID member associated therewith and equipment includes a second RFID member associated therewith, wherein the equipment is configured for operably coupling with the dispensing mechanism. A RFID reader can be used to read information from the first and second RFID members to verify that the equipment is compatible with the contents contained in the fluid containment drum before the contents are dispensed from the fluid containment drum to the equipment. The first RFID member associated with the fluid containment drum can be laminated in an identification tag that is selectively removably coupleable with the dispensing mechanism. Alternatively, the first RFID member associated with the fluid containment drum can be integrally molded in a surface of the fluid containment drum by way of film insert molding, wherein the RFID film member including a first film layer, a second film layer, and a RFID tag encapsulated therebetween, and wherein the first film layer provides a barrier layer between the RFID tag and the enclosure portion during the film insert molding.

In yet another aspect, the present invention relates to an identification tag for fluid containment and dispensing systems having a dispense mechanism. The identification tag can include a RFID member holder having a first laminate and a second laminate laminated to the first laminate, the first and second laminates having an aperture defined therethrough. The identification tag further includes a RFID member disposed between the first and second laminates that can include a first film layer, a second film layer, and a RFID tag encapsulated between the first and second film layers, wherein the aperture is configured for selectively removably coupling the RFID member holder to a dispense mechanism included with a fluid containment and dispensing system. The first and second laminates can be generally of different size and shape such that when the first and second laminates are laminated at least a portion of the second laminate is not laminated with the first laminate, wherein the portion can be laser marked with information associated with a fluid containment and dispensing system.

In yet a further aspect, the present invention relates to a method of making a RFID tag holder by providing a first laminate having a first size, a second laminate having a second size, and a RFID member having a first film layer, a second film layer, and a RFID tag encapsulated between the first and second film layers. The first laminate is laminated to the second laminate such that the RFID member is encapsulated therebetween and at least a portion of the second laminate is not laminated to the first laminate. The portion of the second laminate not laminated to the first laminate can be laser marked with identification information such as a date, a bar code, a serial number, coding information associated with a code ring included with the dispensing mechanism, and any combinations thereof.

In an additional aspect, the invention relates to a fluid dispensing system for inhibiting dispensing contents contained in a fluid containment drum to equipment incompatible with the contents. The system can include a fluid containment drum having a first RFID member associated therewith, the fluid containment drum having an opening defined thereon and a drum insert operably coupled to the opening and configured to access the contents of the fluid containment drum. The system can further include equipment having a dispense head operably coupled thereto, the dispense head having a second RFID member associated therewith, the dispense head configured for operably coupling with the drum insert. A RFID reader can be used to read information from the first and second RFID members to verify that the dispense head is compatible with contents contained in the fluid containment drum before the contents in the fluid containment drum are dispensed from the fluid containment drum to the equipment. At least one of the first or second RFID members can be laminated in an identification tag selectively coupleable and decoupleable with the dispensing mechanism (e.g., drum insert or dispense head) or containment drum, wherein the identification tag includes a first laminate and a second laminate, the RFID tag being disposed between the first and second laminates. Alternatively, the first RFID member can be integrally molded in a surface of the fluid containment drum by way of film insert molding, the RFID film member including a first film layer, a second film layer, and a RFID tag encapsulated therebetween, and wherein the first film layer provides a barrier layer between the RFID tag and the enclosure portion during the film insert molding.

The present invention also relates to a method of identifying a fluid containment and dispensing system. The method includes providing a fluid containment drum having a wall, a top structure, and a bottom structure, wherein at least one of the top or bottom structures includes an opening defined thereon configured for operably coupling a drum insert thereto. An identification tag can be selectively coupled with the drum insert, the identification tag having a first laminate, a second laminate laminated to the first laminate, and a RFID member disposed between the first and second laminates, wherein the RFID member includes information associated with a fluid containment and dispensing system. The drum insert is then operably coupling the drum insert with the opening, such that the information associated with a fluid containment and dispensing system is then available on the fluid containment drum.

BRIEF DESCRIPTION OF THE DRAWINGS

FIG. 8 is a cross-sectional view of a RFID member according to a first embodiment of the identification tag of FIG. 7;

FIG. 9 is a cross-sectional view of a RFID member according to a second embodiment of the identification tag of FIG. 7.

DETAILED DESCRIPTION OF THE DRAWINGS

Figure 1:
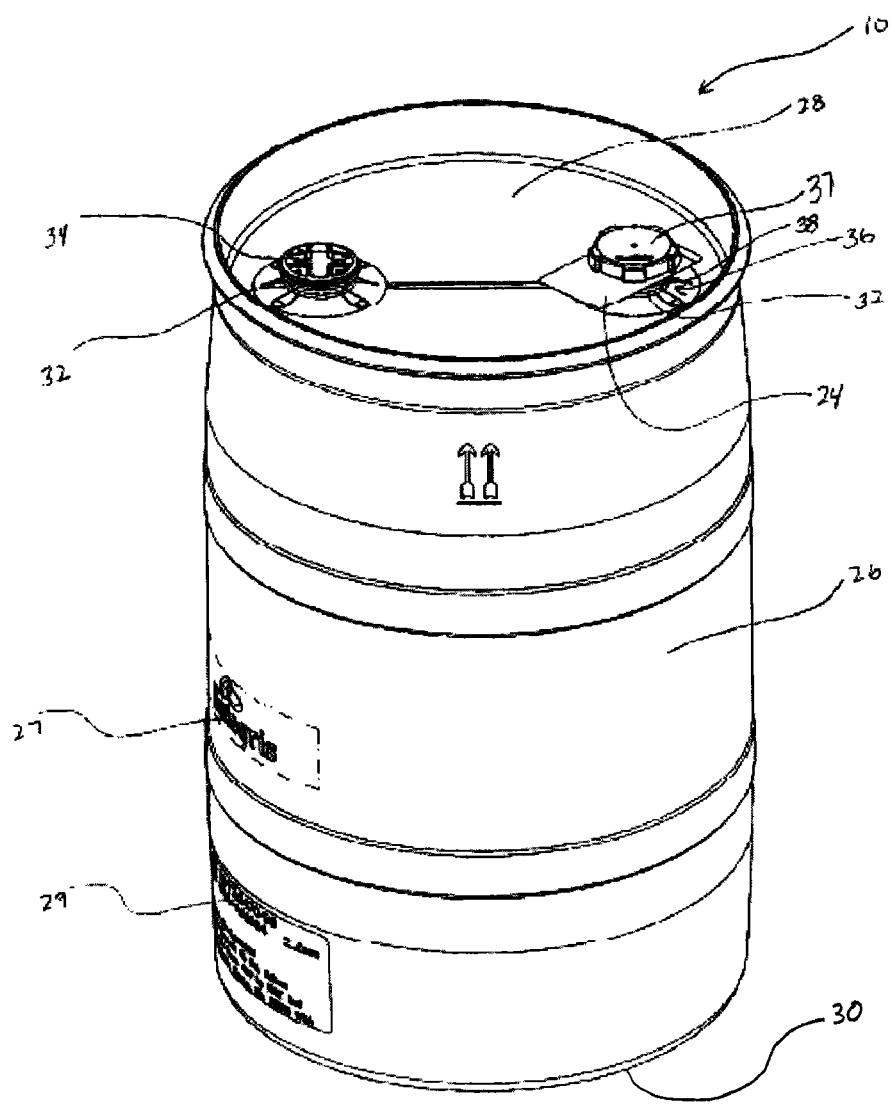
FIG. 1 is a perspective view of a fluid containment drum according to an embodiment of the present invention, depicting an identification tag operably coupled to a drum insert.
Figure 2:
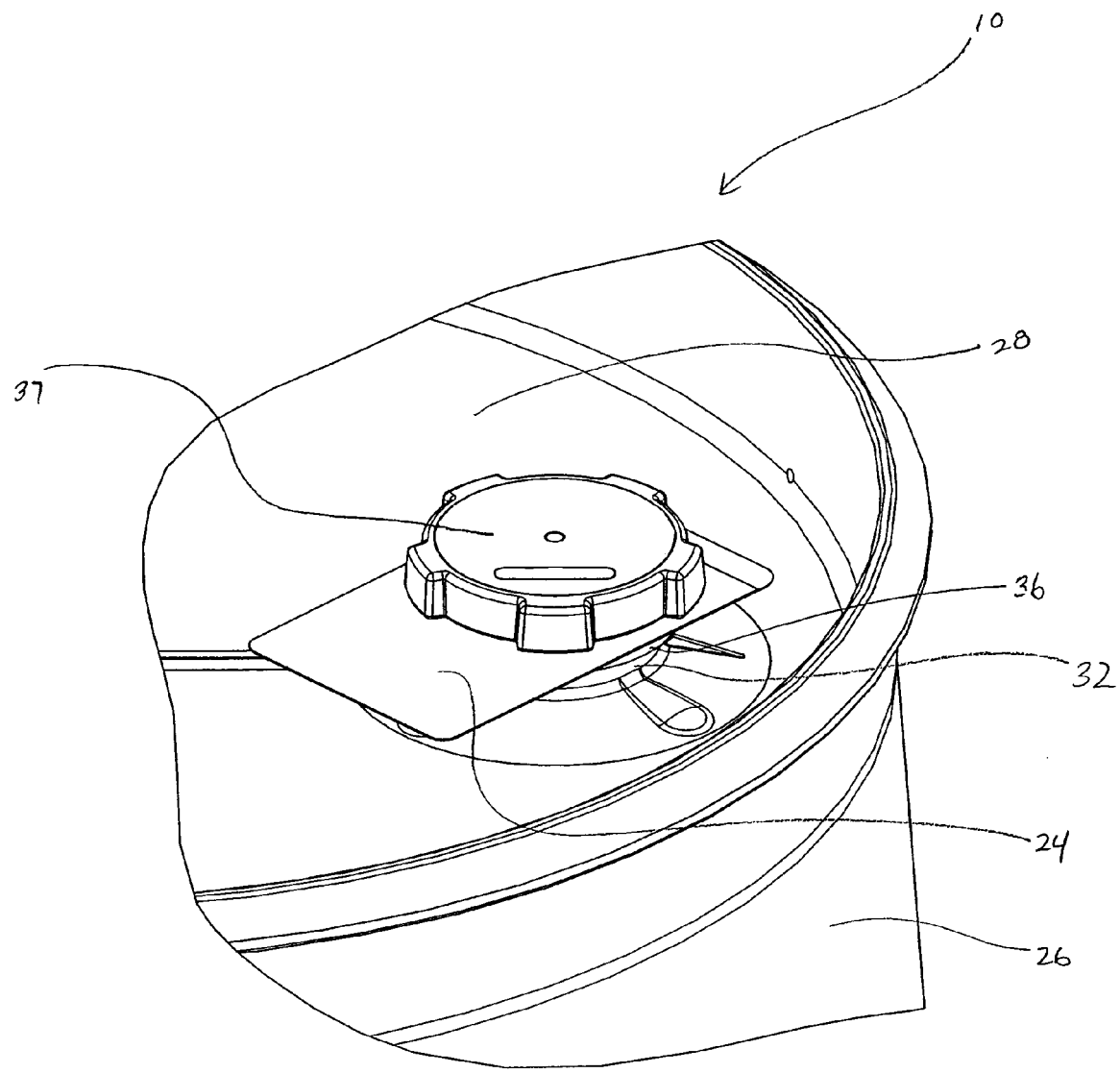
FIG. 2 is a close up view of the identification tag of FIG. 1.

Referring to FIGS. 1 and 2, a fluid containment and dispensing system 10 of the present invention broadly includes a fluid containment drum 20, a dispensing mechanism having a dispense head and a drum insert 36 operably coupled with fluid containment drum 20 and configured to dispense contents of fluid containment drum 20, and a selectively coupled identification tag 24 including information associated with fluid containment drum 20 or contents thereof, dispensing mechanism, or any components or equipment associated with fluid containment drum 20 or dispensing mechanism. While an upper portion 38 of drum insert 36 of dispensing mechanism is depicted in FIG. 1, the dispense head portion of dispensing mechanism is described in detail herein with respect to FIG. 3.

Fluid containment drum 20 generally comprises a generally cylindrical wall portion 26, a top structure 28, and a bottom structure 30, wherein top structure 28 comprises at least one access opening or bung opening 32 defined thereon for selectively coupling dispense mechanism 22 thereto. Access openings or bung openings 32 not having a portion of a dispense mechanism 22, such as a drum insert 36, coupled thereto can be selectively covered by a shipping plug or cover 34. Fluid containment drum 20 can further comprise indicia such as a manufacturer logo 27 and manufacturer or chemical information 29 on a label attached thereto or molded therein.

Fluid containment drum 20 can be constructed of single or multiple layers, such as polymer layers formed in a blow-molding process. In addition, fluid containment drum 20 can be formed of a fluoropolymer, such as PFA or PTFA, although those skilled in the art will recognize that other materials for fluid containment drum 20 can be used. Examples of fluid containment drums 20 that can be used for fluid containment and dispensing system 10 are depicted and described in U.S. Pat. No. 6,045,000 and U.S. Patent Publication No. 2002/0050494, both of which are incorporated herein by reference in their entirety.

Figure 3:
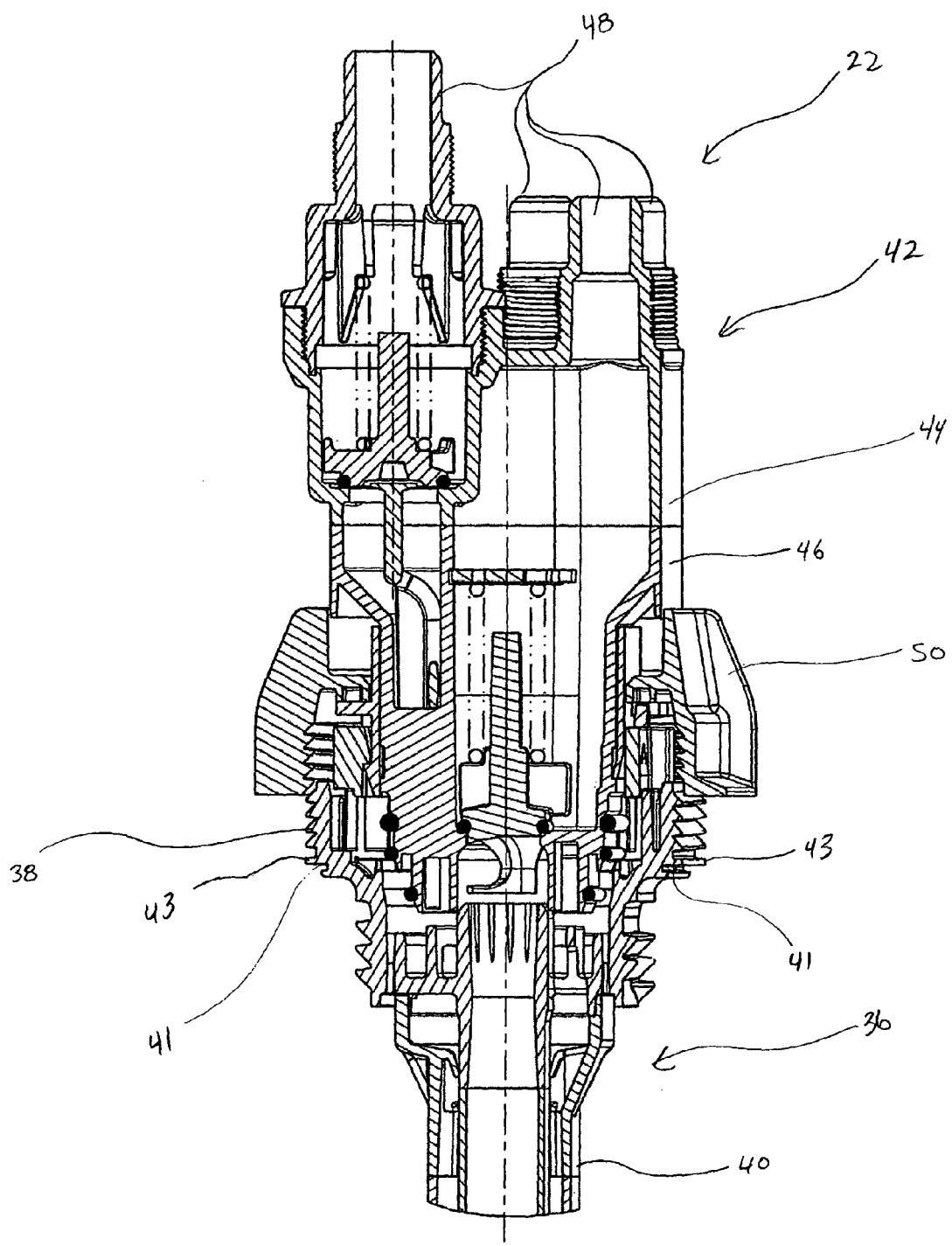
FIG. 3 is a fragmentary elevational cross-sectional view of a dispensing mechanism for dispensing contents of the fluid containment drum.
Figure 4:
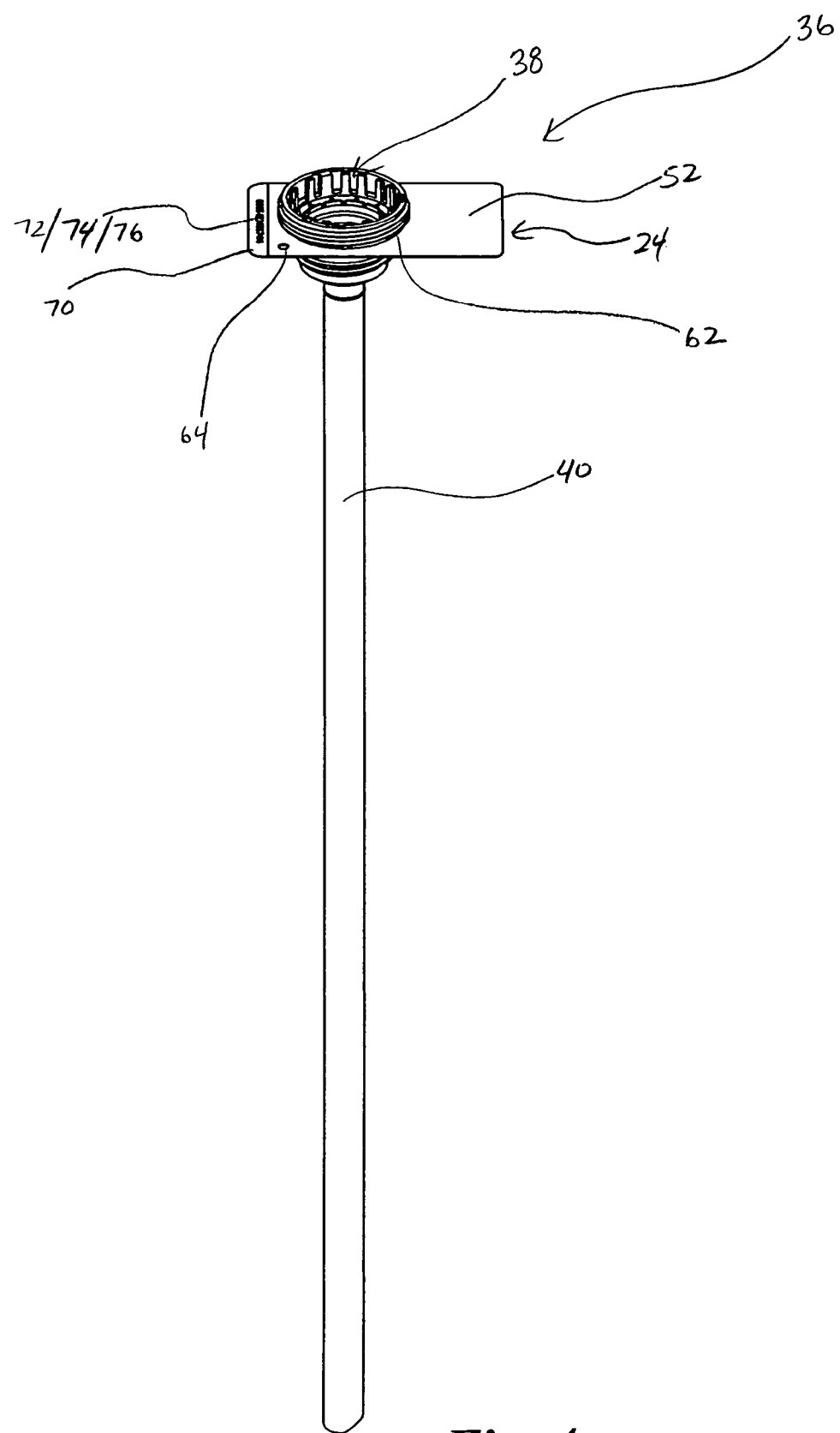
FIG. 4 is a perspective view of a drum insert, depicting an identification tag operably coupled to an upper portion of the drum insert.
Figure 5:
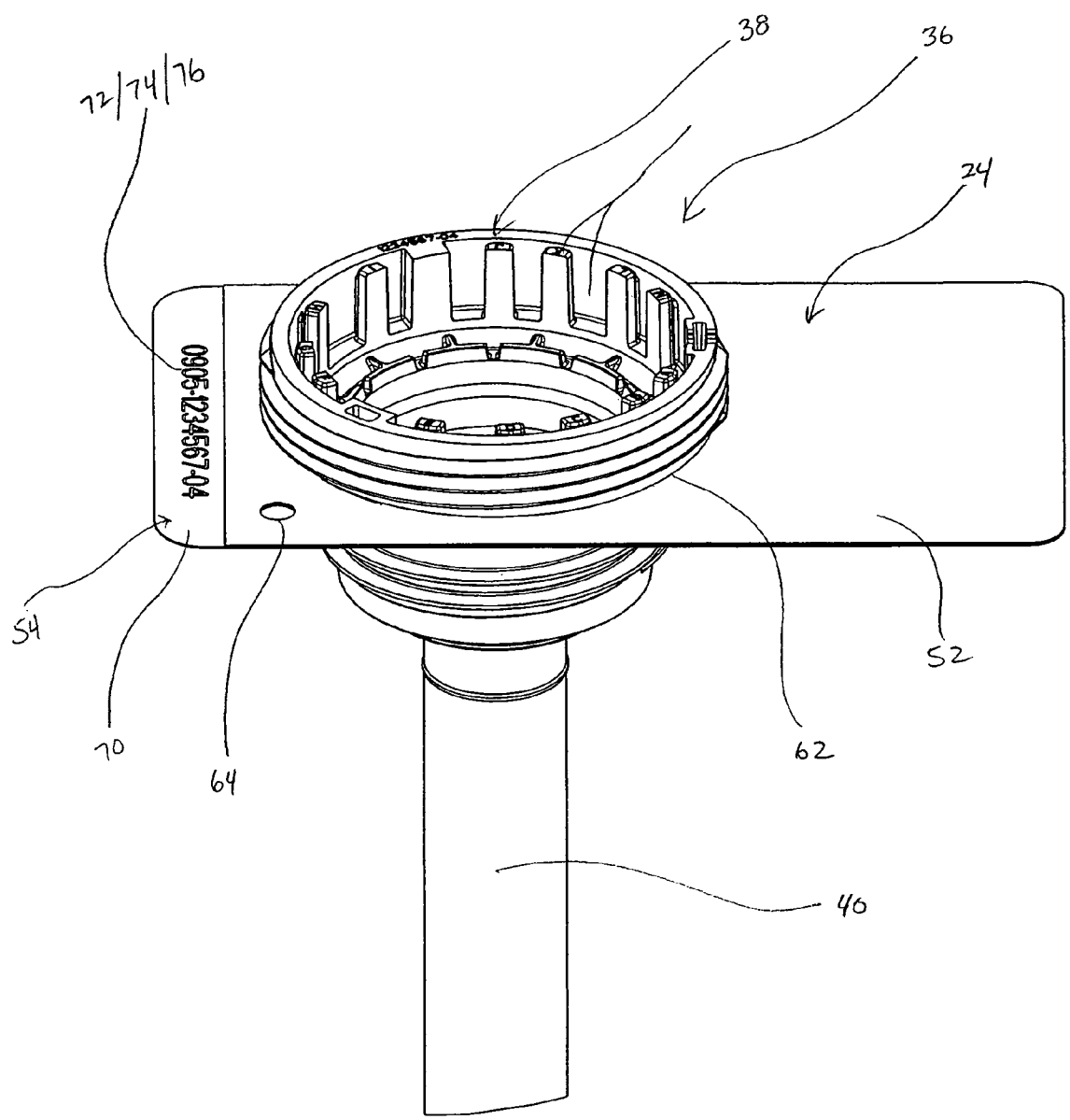
FIG. 5 is a close up view of the identification tag of FIG. 4.

Referring to FIG. 3, dispense mechanism 22 can comprise a drum insert 36 having an upper portion 38 that can be threaded and a lower down tube portion 40 that can extend therefrom into an interior of fluid containment drum 20 for accessing contents or fluids therein. In addition, drum insert 36 can include an undercut or recess 41 that is formed on upper portion 38 of drum insert 36 proximate a flange 43 for operably coupling identification tag 24 thereto. Referring to FIGS. 1 and 2, drum insert 36 can further include a cap assembly or closure 37 that can be used when transporting or storing fluid containment drum 20.

Referring again to FIG. 3, dispense mechanism 22 can further comprise a dispense head 42 selectively coupleable with upper portion 38 of drum insert 36. A dispense head 42 can generally include an upper body section 44, a lower body section 46 coupled thereto, a plurality of fittings 48, and a coupling assembly 50 for operably coupling drum insert 36 and dispense head 42.

Examples of drum inserts 36 that can be used with fluid dispensing system 10 are described in U.S. Pat. No. 6,045,000 and U.S. Patent Publication No. 2003/0010387, both of which are incorporated herein by reference in their entirety. Examples of dispense heads 42 that can be used with fluid dispensing system 10 are described in U.S. Pat. Nos. 4,699,298, 5,108,015, 5,957,328, and 5,526,956, all of which are incorporated herein by reference in their entirety. Other examples of drum inserts 36 and dispense heads 42 that can be used for fluid containment and dispensing system 10 are depicted and described in Provisional Patent Application No. 60/669,945 entitled "High Volume Fluid Dispense System," filed Apr. 8, 2005, which is incorporated herein by reference in its entirety.

Referring to FIGS. 1, 2, 4, and 5, and as will be described in detail herein, identification tag 24 can be hung or operably coupled to drum insert 36, such as on recess 41 that is formed on upper portion 38 of drum insert 36 proximate flange 43.

Figure 6:
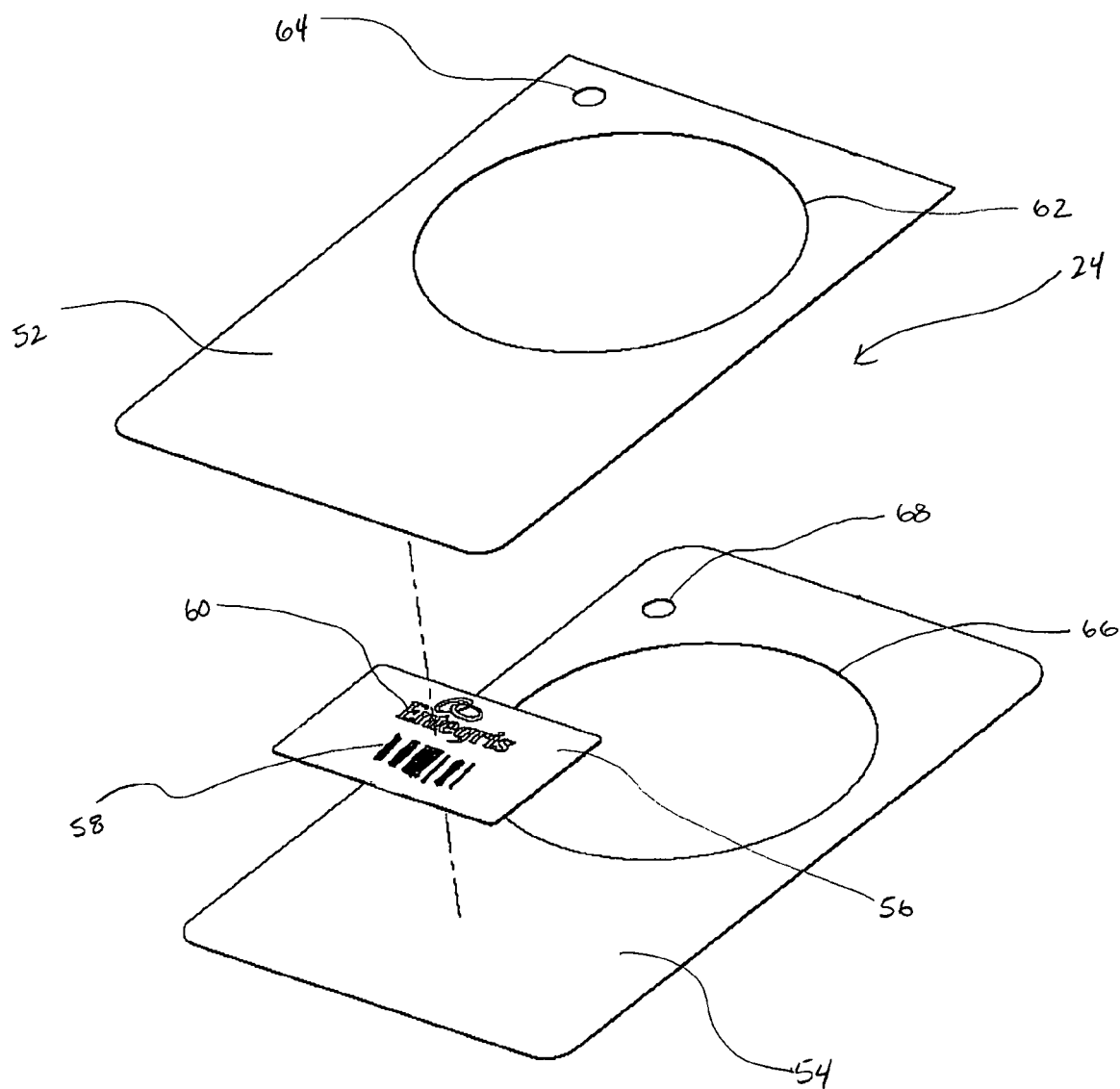
FIG. 6 is an exploded view of the identification tag of FIG. 4.
Figure 7:
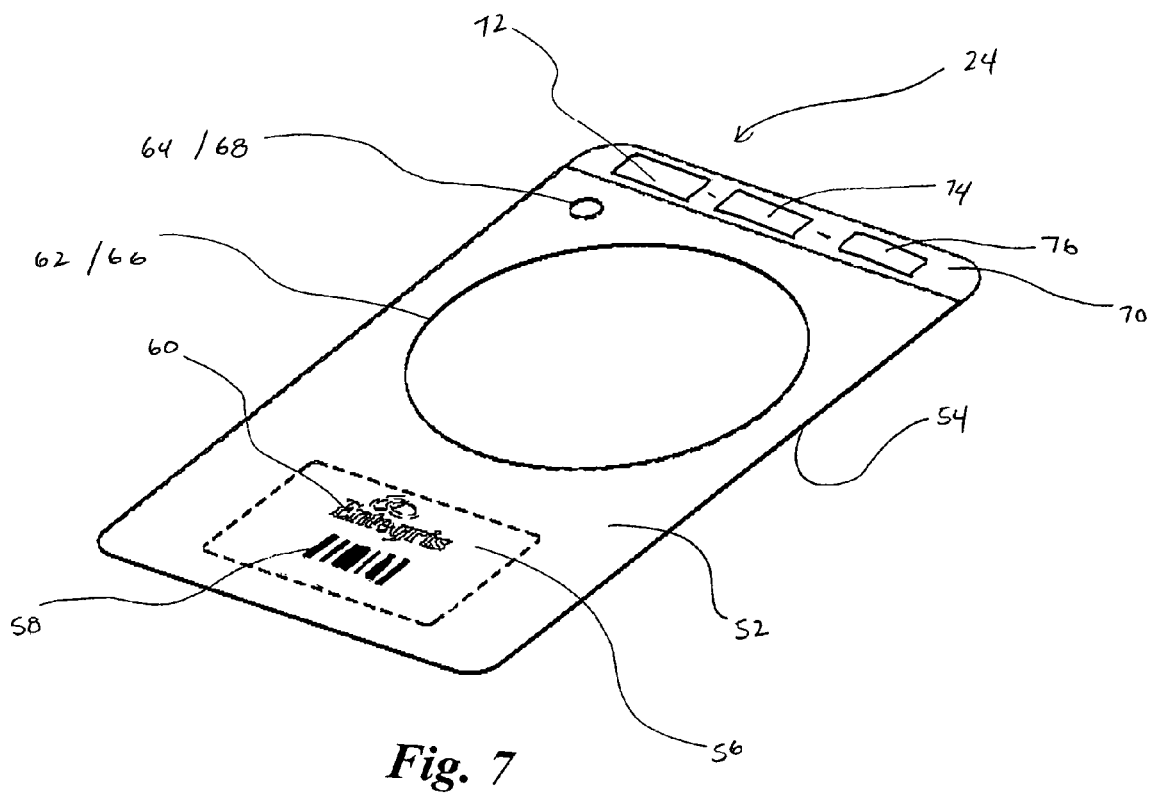
FIG. 7 is a perspective view of the identification tag of FIG. 4, depicting the edge of an RFID member in broken lines and indicia marked on a portion of a second laminate of the identification tag.

Referring to FIGS. 6 and 7, identification tag 24 generally includes a first laminate 52, a second laminate 54, and a RFID member 56 disposed therebetween. In other embodiments, RFID member 56 can be disposed on a single laminate and protected opposite the single laminate with a protective layer, such as ethylene vinyl acetate (EVA).

Identification tag 24 can also have other indicia thereon, such as a bar code 58 and/or logo 60, on or within laminae 52, 54 and/or on RFID member 56. As depicted in FIGS. 6 and 7, in addition, first laminate 52 can comprise a first aperture 62 for operably coupling identification tag 24 with dispense mechanism 22 or other structure and a second aperture 64 for selectively coupling a tie, such as a wire tie, thereto.

Second laminate 54 can also comprise a corresponding first aperture 66 for operably coupling identification tag 24 with dispense mechanism 22 or other structure and a corresponding second aperture 68 for selectively coupling a tie thereto. Second laminate 54 can also comprise indicia laser marked thereon, such as on a portion 70 of second laminate 54 not coupled with first laminate 52, including, for example, a date 72, a serial number 74, or a coding code 76 corresponding to coding included on a portion of dispensing mechanism 22. As will be discussed below, first apertures 62, 66 can be slightly larger than recess 41 included on drum insert 36, such that identification tag 24 can loosely hang on drum insert 36, yet tight enough that it can remain with drum insert 36 through normal use.

First and second laminae 52, 54 can be constructed of low-density or high-density polyethylene, although those skilled in the art will recognize that other materials can be used. In addition, laminae 52, 54 can be transparent, translucent, or opaque. By having a laminate of chemically resistant material, such as polyethylene, over bar code 58, logo 60, and RFID member 56, the indicia and RFID components can be protected from chemicals being spilled on identification tag 24 and from fumes in the area.

Referring to FIG. 8, in an embodiment, RFID member 56 can include two thin flexible thermoplastic polymer films 78, 80 and a RFID tag 82 disposed therebetween. Films 78, 80 can each include one or more film layers at least partially defined by a limited level of thickness. For instance, each of films 78, 80 can include a thickness of less than or equal to about 0.040 inches. In other embodiments, each of films 78, 80 can comprise a thickness of less than or equal to about 0.020 inches (twenty-thousandths). In still further embodiments, either or both of films 78, 80 can be constructed or formed of multi-layer film laminates.

Referring to FIG. 9, in another embodiment, RFID member 56 can include one thin flexible thermoplastic polymer film 84 and a RFID tag 86 disposed thereupon. In this embodiment, RFID tag 86 can be encapsulated or covered opposite the one thin flexible thermoplastic polymer film 86 with a layer of protective material 86, such as ethylene vinyl acetate (EVA).

Any compatible material can be utilized for films 78, 80, 84 of FIGS. 8 and 9. Some examples include polyester, PE, PC, PP, polyimide (PI), polyether imide (PEI), PEEK, PFA, fluorinated ethylene propylene copolymer (FEP), polyvinylidene fluoride (PVDF), polymethyl methacrylate (PMMA), polyether sulfone (PES), polystyrene (PS), polyphenylene sulfide (PPS), and other compatible polymers known to those skilled in the art can be used. In an embodiment, the material selection for at least one of films 78, 80, 84 will be PC. Other embodiments can utilize PP, PEEK, and PEI for films 78, 80, 84, or any combinations thereof.

Either embodiment of the RFID member 82, 86 can be active or passive RFID tags and can include a photovoltaic cell and/or thin film battery. Such active or passive RFID tags can be tags known to those skilled in the art. For example, RFID tag 82 includes a flexible circuit and circuit components such as that manufactured and sold under the TI Tag-it HF-I, RI-103-112A, product identifier. Such a RFID tag 82 can have an operating temperature of −25° C. to +70° C., a base PET substrate material, a 0.3555 mm chip thickness, and support for the ISO 15693-2, -3 standard. As stated, other compatible RFID tags 82 known to those skilled in the art can also be used.

RFID tag 82 can be bonded between films 78, 80 or onto film 84 utilizing compatible adhesives or with other techniques of laminate construction or bonding known to those skilled in the art. Further, in an embodiment, at least one of films 78, 80, 84 can include a recess or thermoformed indentation sized and shaped to receive RFID tag 82, 86 therein. At least one of films 78, 80, 84 can include graphical indicia such as product identifiers, company logos, textual instructions, bar code(s), serial number(s), dates, and the like.

Films 78, 80, 84 can be generally cut to a predetermined shape and size depending on the particular needs of the bonding application. In the embodiment depicted in FIG. 8, films 78, 80 are of substantially identical dimensions. Various other embodiments utilize films 78, 80 differing shapes and sizes, with films 78, 80 preferably being at least large enough to protectively cover the sensitive components of encapsulated RFID tag 82.

As referenced herein, each of films 78, 80 can be constructed of various film layers to further create a film laminate for each of the respective films. Such film laminates for the films can be employed to provide additional preferred characteristics in the film laminate, such as those understood to add abrasion resistance, chemical resistance, temperature resistance, absorption barriers, outgassing barriers, and like characteristics to the portion or surface of the handling device moldably receiving the film laminate. Other film lamination techniques known to those skilled in the art are envisioned for use with the present invention. For example, U.S. Pat. Nos. 3,660,200, 4,605,591, 5,194,327, 5,344,703, and 5,811,197 disclose various thermoplastic lamination techniques, all of which are incorporated herein by reference in their entirety. Some examples of RFID members 56 that can be used in identification tag 24 according to the present invention are described in U.S. Pat. Nos. 5,973,600, 6,147,662, 6,100,804, and 6,451,154, and European Patent Application No. 0 855 675 A2, all of which are incorporated herein by reference.

Referring again to FIGS. 4 and 5, identification tag 24 can be placed onto fluid dispensing system 10. First apertures 62, 66 on identification tag 24 can be hung or otherwise disposed on undercut or recess 41 that is formed on upper portion 38 of drum insert 36 proximate flange 43. First apertures 62, 66 on identification tag 24 can be slightly larger than undercut or recess 41, such that identification tag 24 can loosely hang on drum insert 36, yet tight enough that it can remain with drum insert 36 through normal use.

In another embodiment, identification tag 24 can be adhered or otherwise molded into drum insert 36, containment drum 20, dispense head 42, or other components associated or connected to drum insert 36, containment drum 20, or dispense head 42. For example, identification tag 24 can be film insert molded (FIM) into containment drum 20, such as on wall 26, top structure 28, or bottom structure 30, using, for example, a process such as that depicted in U.S. Patent Publication No. 2004/0238623, which is incorporated herein by reference in its entirety. In this embodiment, RFID members 56, 58 according to the embodiments as depicted in FIGS. 8 and 9, respectively, can be selectively placed along a shaping surface in a mold cavity for alignment with a desired target surface of a moldable molten resin material such that upon completion of the film insert molding process, RFID member 56 or 58 is integrally bonded to at least a portion of containment drum 20. Alternatively, tag 24 can be embedded or otherwise film insert molded (FIM) into drum insert 36 or dispense head 42, or other components associated or connected to containment drum 20, drum insert 36, or dispense head 42.

Once identification tag 24 has been coupled with or formed in drum insert 36, containment drum 20, dispense head 42, or components associated or connected therewith, tag 24 can be used for identification, tracking, and safety/redundancy verification purposes such as those described below.

Identification tag 24 can be used to track and store the number of round trips or cycles that a containment drum 20 and contents thereof have made. In some circumstances, it is desirable that certain chemicals are only transported for a period, for example, six months. After that, there is a concern that the chemical might degrade the containment drum at which time containment drum 20 should be taken out of service and discarded.

Identification tag 24 can also be used to track and store the number of round trips or cycles that a particular containment drum 20, drum insert 36, or dispense head 42 has made for maintenance purposes. For example, 0-rings that are incorporated into drum insert 36 or dispense head 42 might need service or replacement. After a year, the 0-rings might need to be replaced or a pressure or leak test might need to be performed. The maintenance data and/or results of any tests can be captured in RFID member 56, as member 56 is not only a read tag but can be a read-write tag.

There are other uses available with being able to read and write to RFID member 56. For example, RFID member 56 can be used to store the various information, such as the lot number of the fluid that is contained in containment drum 20, the lot number of containment drum 20, the serial number of containment drum 20, drum insert 36, dispense head 42, or other components associated or connected to containment drum 20, drum insert 36, or dispense head 42.

Also, any changes in safety procedures, information on the chemicals, and any and all information relating to containment drum 20, drum insert 36, dispense head 42, or other components associated or connected to containment drum 20, drum insert 36, dispense head 42 can be modified and associated differently simply by re-writing or programming RFID member 56.

Because RFID member 56 can be written thereto, users can perform any "on the fly" modifications to the tag 24 without manual removal or physically altering containment drum 20 or dispensing equipment. This can also be done while containment drum 20 is being used so that the equipment does not have to be turned off or containment drum 20 be removed for any modifications.

RFID member 56 can also be used to store and record the chemical company that manufactured the contents of containment drum 20. RFID member 56 can be used to store the end-use customer to receive containment drum 20. By doing this, containment drum 20 can be contained within a direct, specific loop between the chemical company and a specific end-use customer. This can be important because users often have large loops in which a customer purchases many containment drums but dedicates a portion of them to a specific fabrication, and another portion to a different fabrication. Because separating the different loops could be a cumbersome process, RFID member 56 could assist with this separation itself, saving the users much time and expense.

Figure 10:
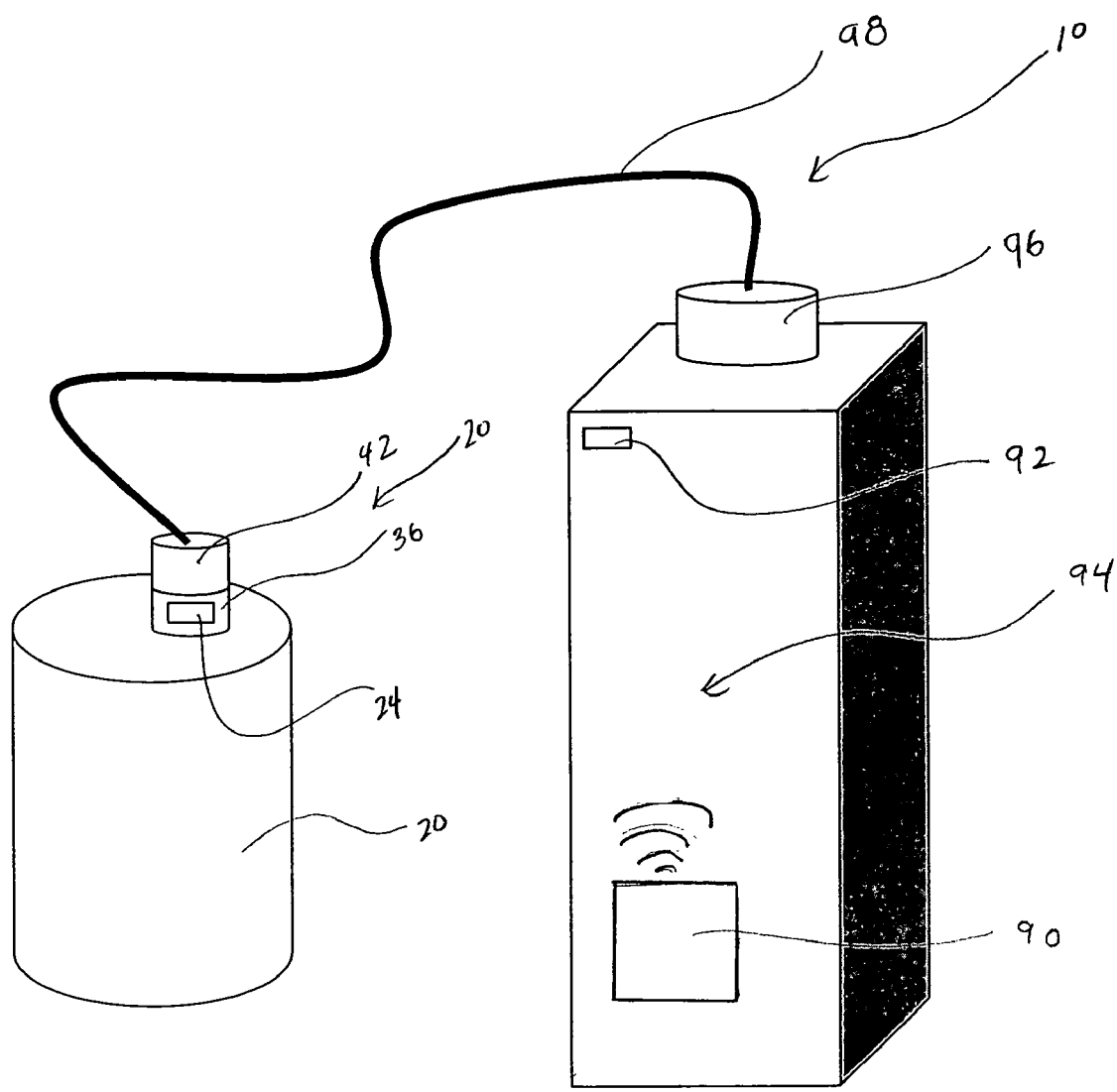
FIG. 10 is a schematic view of the fluid containment drum of FIG. 1, depicting the fluid containment drum operably coupled to equipment.
Figure 11:
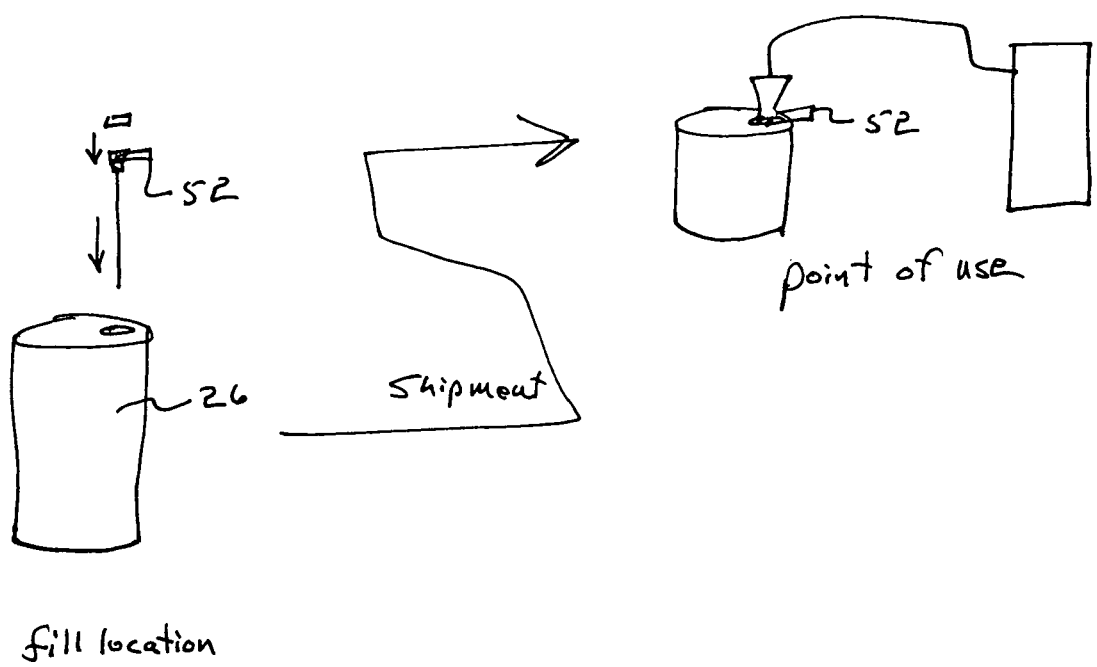
FIG. 11 is a schematic view of the attachment of the tag at a fill location and shipment to point of use.

In addition, referring to FIG. 10, by using a radio-frequency (RF) reader 90 to read a RFID member 92 on an equipment 94, RFID member 92 can inform a user what type of fluid is needed for or compatible with equipment 94, such as sulfuric or nitric acid. The user would then use reader 90 to read identification tag 24 associated with fluid containment drum 20 to confirm that it matches the product that equipment 94 is designed to dispense. RF reader 90 can be a handheld unit or can be incorporated into a structure, such as containment drum 20 or equipment 94.

If RFID member 92 on equipment 94 and tag 24 on containment drum 20 do not match, from a safety standpoint, the operator would have to push containment drum 20 away as equipment 94 will not enable the contents of containment drum 20 to be dispensed out of containment drum 20. The operator would then be required to find and retrieve containment drum 20 that does have a tag 24, and thus contents, that are compatible with the particular piece of equipment 94.

Software can be incorporated into equipment 94 such that a pump 96 operating equipment 94 will only operate when a reader 90 verifies that the contents of containment drum 20 are compatible with equipment 94. If there is not a match between containment drum 20 and equipment 94, pump 96 will not operate and thus avoid the incompatible chemical from being pumped by equipment 94 through a line 98 out of containment drum 20. If there is a match, pump 96 will be enabled to operate.

RFID member 56 can be used to capture and store the chemical assay of the product, or chemical make-up, of the product contained in containment drum 20. Currently some assays are transferred electronically through files. Users could capture the chemical assays of the products in RFID tags 24 without having to transfer the assays. When customers receive containment drums 20, they would simply need to read tag 24 and know what the product is in containment drum 20.

From a safety standpoint, identification tag 24 can be used in conjunction with any of a number of verification features, including, but not limited to, key code, bar code, laser etching, and color coordination to inhibit coupling improper equipment or dispensing components to a containment drum 20. Thus, fluid dispensing system 10 can include a multi-tier safety process, wherein two or more safety precautions are selected from the group consisting of containment drum 20 with tag 24, key coding built into a coupling assembly, bar code, text indication, color coding, or any combination thereof. If any of the safety precautions fault or are bypassed by a user, there can be one or more additional safety precautions present that inhibit a piece of equipment from dispensing from incompatible containment drums.

In a further embodiment, drum insert 36 and dispense head 42 can each include their own coupled, embedded, or adhered tag 24. This embodiment can be used in situations in which a user wants to confirm that drum insert 36 and dispense head 42 mate. In operation, the user would scan tag 24 for both drum insert 36 and dispense head 42. If the RFID designations for containment drum 20 and dispense head 42 do not match, then equipment will not enable the contents of containment drum 20 to be dispensed out of containment drum 20.

The invention has been described above with reference to several embodiments thereof. It will be apparent to those skilled in the art that alterations may be made in the embodiments described without departing from the scope of the invention. Thus, the scope of the present invention should not be limited by the embodiments described herein, but rather by the language of the claims and the equivalents of those structures.

What is claimed is:

1. A method of tagging a fluid containment drum, the method comprising:
   providing a fluid containment drum and a drum insert having an upper portion and a tube extending therefrom;
   operably attaching an identification tag configured as a card to the upper portion of the drum insert, the identification tag comprising at least one laminate and a RFID member presented thereon, the RFID member comprising information associated with at least one of the fluid containment drum and contents thereof; and
   operably coupling the upper portion of the drum insert having the identification tag attached thereto with an opening presented on the fluid containment drum, such that the identification tag is captured between at least part of the upper portion of the drum insert and the fluid containment drum and the tube extends into an interior of the fluid containment drum for accessing the contents, wherein the identification tag is detachable from the upper portion of the drum insert when the drum insert is not coupled with the opening and not detachable from the upper portion of the drum insert without damaging the identification tag when the drum insert is coupled with the opening.

2. A method of tagging a fluid containment drum, the method comprising:
   providing a fluid containment drum and a drum insert having an upper portion and a tube extending therefrom;
   operably attaching an identification tag configured as a card to the upper portion of the drum insert, the identification tag comprising at least one laminate and a RFID member presented thereon, the RFID member comprising information associated with at least one of the fluid containment drum and contents thereof;
   operably coupling the upper portion of the drum insert having the identification tag attached thereto with an opening presented on the fluid containment drum, such that the tube extends into an interior of the fluid containment drum for accessing the contents, wherein the identification tag is detachable from the upper portion of the drum insert when the drum insert is not coupled with the opening and not detachable from the upper portion of the drum insert without damaging the identification tag when the drum insert is coupled with the opening; and
   further providing a recess proximate a flange included on the upper portion of the drum insert for operably attaching the identification tag thereto, wherein the recess and flange are exterior of the fluid containment drum when the drum insert is coupled to the opening.

3. The method of claim 2, further providing an aperture on the identification tag, the aperture having an aperture diameter greater than a diameter of the recess and less than a diameter of the flange, such that the aperture can be operably attached to the drum insert at the recess and retained on the drum insert at least in part by the flange.

4. The method of claim 3, wherein operably attaching the identification tag to the upper portion of the drum insert comprises inserting the tube into the aperture and effecting movement of the identification tag relative to the drum insert until the identification tag is proximate the upper portion, such that the aperture of the identification tag can be operably attached to the recess.

5. A container for highly pure fluids, the container comprising:
   a fluid containment drum and a drum insert having an upper portion and a tube extending therefrom;
   an identification tag configured as a card operably attached to the upper portion of the drum insert, the identification tag comprising at least one laminate and a RFID member presented thereon, the RFID member comprising information associated with at least one of the fluid containment drum fluids contained therein, wherein the upper portion of the drum insert having the identification tag attached thereto is operably coupled with an opening presented on the fluid containment drum, such that the identification tag is captured between at least part of the upper portion of the drum insert and the fluid containment drum and the tube extends into an interior of the fluid containment drum for accessing the fluids, wherein the identification tag is detachable from the drum insert when the drum insert is not coupled with the opening and not detachable from the drum insert without damaging the identification tag when the drum insert is coupled with the opening.

6. The container of claim 5, wherein the RFID member comprises a first film layer, a second film layer, and a RFID tag encapsulated between the first and second film layers.

7. The container of claim 5, wherein the at least one laminate comprises low-density polyethylene.

8. The container of claim 5, wherein the RFID member selectively stores information selected from the group consisting of:
 a lot number of the fluid containment drum;
 a lot number of the drum insert;
 a serial number of the fluid containment drum;
 a serial number of the drum insert; and
 any combinations thereof 9. The container of claim 5, wherein the RFID member selectively stores information selected from the group consisting of:
 an assay of contents contained in the drum;
 an age of contents contained in the drum;
 one or more types of equipment compatible with contents contained in the drum; and
 any combinations thereof 10. The container of claim 5, wherein the RFID member selectively stores information selected from the group consisting of:
 operational cycles of the fluid containment drum;
 operational cycles of the drum insert;
 operational cycles of support components associated with one or more of the with the fluid containment drum and the drum insert; and
 any combinations thereof.

11. The container of claim 5, wherein the RFID member further comprises indicia selected from the group consisting of:
 bar code;
 serial number;
 coding information associated with a code ring included with the dispensing mechanism; and
 any combinations thereof.

12. The container of claim 5, wherein the at least one laminate further comprises indicia selected from the group consisting of:
 bar code;
 date;
 serial number;
 coding information associated with a code ring included with the dispensing mechanism; and
 any combinations thereof.

13. A container for highly pure fluids, the container comprising:
 a fluid containment drum and a drum insert having an upper portion and a tube extending therefrom;
 an identification tag configured as a card operably attached to the upper portion of the drum insert, the identification tag comprising at least one laminate and a RFID member presented thereon, the RFID member comprising information associated with at least one of the fluid containment drum fluids contained therein, wherein the upper portion of the drum insert having the identification tag attached thereto is operably coupled with an opening presented on the fluid containment drum, such that the tube extends into an interior of the fluid containment drum for accessing the fluids, wherein the identification tag is detachable from the drum insert when the drum insert is not coupled with the opening and not detachable from the drum insert without damaging the identification tag when the drum insert is coupled with the opening; and
 wherein the identification tag comprises an aperture extending through the at least one laminate and the drum insert comprises a recess proximate and a flange on the upper portion thereof, the aperture coupleable to the recess proximate the flange.

14. A fluid containment and dispensing system comprising:
 a fluid containment drum having an opening defined thereon and an interior for containing highly pure fluid;
 a drum insert operably coupled to the opening, the drum insert having an upper portion and a tube extending therefrom into the interior of the fluid containment drum;
 an identification tag having an aperture defined thereon operably attached to the drum insert such that when the drum insert is operably coupled to the opening, the identification tag is captured between at least part of the drum insert and the fluid containment drum such that it cannot be removed from the drum insert without damaging the identification tag, the identification tag comprising at least one laminate and a RFID member presented thereon, the RFID member comprising first information associated with at least one of the fluid containment drum or the highly pure fluid; and
 a second identification member operably attached to at least one of the fluid containment drum or drum insert, the second identification member comprising second information associated with at least one of the fluid containment drum or the contents thereof, wherein the first and second information are configured to be used as a redundant mechanism to inhibit dispensing the highly pure fluid to a process incompatible with the contents.

15. The fluid containment system of claim 14, further wherein the second identification member is selected from the group consisting of:
 a bar code;
 a code ring included with the drum insert; and
 any combinations thereof.

* * * * *

UNITED STATES PATENT AND TRADEMARK OFFICE
CERTIFICATE OF CORRECTION

| | | |
|---|---|---|
| PATENT NO. | : 7,760,104 B2 | Page 1 of 1 |
| APPLICATION NO. | : 11/400053 | |
| DATED | : July 20, 2010 | |
| INVENTOR(S) | : Wayne Asp et al. | |

It is certified that error appears in the above-identified patent and that said Letters Patent is hereby corrected as shown below:

Col. 10, line 20, delete "0-rings" and insert --O-rings--

Col. 10, line 22, delete "0-rings" and insert --O-rings--

Col. 13, line 25, insert a -- . -- after "thereof"

Col. 13, line 40, delete "with the"

Signed and Sealed this
Third Day of May, 2011

David J. Kappos
*Director of the United States Patent and Trademark Office*